(12) United States Patent
Furumochi

(10) Patent No.: US 10,277,853 B2
(45) Date of Patent: Apr. 30, 2019

(54) IMAGE CAPTURING APPARATUS AND CONTROL METHOD OF THE SAME

(71) Applicant: CANON KABUSHIKI KAISHA, Tokyo (JP)

(72) Inventor: Hiroyuki Furumochi, Musashimurayama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/589,393

(22) Filed: May 8, 2017

(65) Prior Publication Data

US 2017/0332027 A1 Nov. 16, 2017

(30) Foreign Application Priority Data

May 12, 2016 (JP) .................................. 2016-096363

(51) Int. Cl.
| | |
|---|---|
| *H04N 5/378* | (2011.01) |
| *G06T 3/40* | (2006.01) |
| *H04N 5/232* | (2006.01) |
| *H04N 5/374* | (2011.01) |
| *H04N 5/369* | (2011.01) |

(52) U.S. Cl.
CPC .............. *H04N 5/378* (2013.01); *G06T 3/40* (2013.01); *H04N 5/23235* (2013.01); *H04N 5/23293* (2013.01); *H04N 5/374* (2013.01); *H04N 5/379* (2018.08)

(58) Field of Classification Search
CPC .............................. H04N 5/378; H04N 5/915
USPC .......................................................... 348/308
See application file for complete search history.

(56) References Cited

U.S. PATENT DOCUMENTS

| | | | |
|---|---|---|---|
| 9,906,753 B2 * | 2/2018 | Nakajima | ............... H04N 5/915 |
| 2004/0141211 A1 * | 7/2004 | Furukawa | ............... G06T 11/00 |
| | | | 358/450 |

FOREIGN PATENT DOCUMENTS

JP          2015-136093 A          7/2015

* cited by examiner

*Primary Examiner* — Joel W Fosselman
(74) *Attorney, Agent, or Firm* — Cowan, Liebowitz & Latman, P.C.

(57) ABSTRACT

An image capturing apparatus comprises an image sensor, a controller, and a signal processor. The image sensor includes pixels each having a photoelectric conversion element and a signal storing unit. When in a simple reproduction mode in which the image signals read out from the image sensor undergo simple reproduction, the controller stores, in the signal storing unit, image signals from all pixels output from the image sensor, converts the size of the image signals stored in the signal storing unit into a size for simple reproduction to transfer the image signals to the signal processor, and upon the simple reproduction starting, the image signals from all pixels stored in the signal storing unit are transferred to the signal processor.

8 Claims, 11 Drawing Sheets

FIG. 8A   FIG. 8B   FIG. 8C

IMAGE CAPTURING APPARATUS AND CONTROL METHOD OF THE SAME

BACKGROUND OF THE INVENTION

Field of the Invention

The present invention relates to image capturing apparatuses and control methods of the same.

Description of the Related Art

Recently, the number of pixels in image sensors is on the increase due to the miniaturization of pixels, which has enabled high-resolution images to be captured. Even consumer image capturing apparatuses usually have 10 million to 50 million pixels.

However, the capacity of a signal transfer circuit for transferring signals from an image sensor to a signal processor is fixed, and thus, an increase in the number of pixels in the image sensor relatively lengthens the time taken to transfer image signals from all pixels. FIG. 9 shows a typical configuration of an image sensor and an image processor, and an image processor 900 performs various kinds of signal processing on an image signal that is output from an image sensor 901. The image sensor 901 includes a pixel unit 902 that includes a photoelectric conversion element, an AD conversion unit 903 for converting an image signal that is read out from the pixel unit 902 into a digital signal, and a P/S conversion unit 904 for performing parallel/serial conversion on the image signal that has been converted into a digital signal by the AD conversion unit 903.

To increase the speed of reading out image signals with the above configuration, the speed of reading out image signals from the image sensor 901 to the image processor 900 needs to be increased. For example, even if the image sensor 901 has 24 million pixels, the data volume of each pixel is 12 bits, the frame rate is 120 fps, and data is transferred through eight ports between the P/S conversion unit 904 and the image processor 900, a communication capacity of 4.32 Gbps is required. However, it is difficult to realize such high-speed data transfer due to constraints such as power consumption in circuits, heat generation in transfer circuits and processing circuits, and data transfer accuracy. To address this, Japanese Patent Laid-Open No. 2015-136093 describes a configuration in which image signals are read out from an image sensor at high speed by providing the image sensor with a frame memory for storing image signals from all pixels.

During simple reproduction (quick review) after shooting a still image, image signals are transferred from the image sensor 901 to the image processor 900, development processing is performed by the image processor 900, and image data is output to a display unit (not shown). In this case, the speed of reading out image signals from the image sensor 901 to the image processor 900 may be a factor that inhibits improvement of system performance.

SUMMARY OF THE INVENTION

The present invention has been made in consideration of the aforementioned problems, and realizes an image capturing apparatus capable of shortening the time taken for simple reproduction to be performed after shooting and improving system performance.

In order to solve the aforementioned problems, the present invention provides an image capturing apparatus comprising: an image sensor including two-dimensionally arranged pixels each having a photoelectric conversion element, and a signal storing unit in which image signals that are output from the pixels are stored; a controller which controls an operation to read out signals from the image sensor; and a signal processor which performs signal processing on the image signals read out from the image sensor and output the image signals to a display unit, wherein, when in a simple reproduction mode in which the image signals read out from the image sensor undergo simple reproduction, the controller stores, in the signal storing unit, image signals from all pixels output from the image sensor, converts the size of the image signals stored in the signal storing unit into a size for simple reproduction to transfer the image signals to the signal processor, and upon the simple reproduction starting, the image signals from all pixels stored in the signal storing unit are transferred to the signal processor.

In order to solve the aforementioned problems, the present invention provides an image capturing apparatus comprising: an image sensor including two-dimensionally arranged pixels each having a photoelectric conversion element, and a signal storing unit in which image signals that are output from the pixels are stored; a controller which controls an operation to read out signals from the image sensor; and a signal processor which performs signal processing on the image signals read out from the image sensor and output the image signals to a display unit, wherein, when in a simple reproduction mode in which the image signals read out from the image sensor undergo simple reproduction, the controller stores, in the signal storing unit, image signals from all pixels output from the image sensor, converts the size of the image signals stored in the signal storing unit into a size for simple reproduction to transfer the image signals to the signal processor, and simultaneously transfers the image signals from all pixels stored in the signal storing unit to the signal processor.

In order to solve the aforementioned problems, the present invention provides a control method of an image capturing apparatus which has: an image sensor including two-dimensionally arranged pixels each having a photoelectric conversion element, and a signal storing unit in which image signals that are output from the pixels are stored; a controller which controls an operation to read out signals from the image sensor; and a signal processor which performs signal processing on the image signals read out from the image sensor and output the image signals to a display unit, the method comprising: storing, in the signal storing unit, image signals from all pixels output from the image sensor when in a simple reproduction mode in which the image signals read out from the image sensor undergo simple reproduction; converting the size of the image signals stored in the signal storing unit into a size for simple reproduction to transfer the image signals to the signal processor; and transferring, upon the simple reproduction starting, the image signals from all pixels stored in the signal storing unit to the signal processor.

In order to solve the aforementioned problems, the present invention provides a control method of an image capturing apparatus which has: an image sensor including two-dimensionally arranged pixels each having a photoelectric conversion element, and a signal storing unit in which image signals that are output from the pixels are stored; a controller which controls an operation to read out signals from the image sensor; and a signal processor which performs signal processing on the image signals read out from the image sensor and output the image signals to a display unit, the method comprising: storing, in the signal storing unit, image signals from all pixels output from the image sensor when in a simple reproduction mode in which the image signals read out from the image sensor undergo simple reproduction; and converting the size of the image signals stored in the signal storing unit into a size for simple reproduction to transfer the image signals to the signal processor, and simultaneously transferring the image signals from all pixels stored in the signal storing unit to the signal processor.

According to the present invention, the time taken for simple reproduction to be performed after shooting can be shortened, and system performance can be improved.

Further features of the present invention will become apparent from the following description of exemplary embodiments with reference to the attached drawings.

BRIEF DESCRIPTION OF THE DRAWINGS

FIGS. 7A to 7C are timing charts illustrating a signal readout operation at the time when a quick review display setting is ON and OFF according to the first embodiment, and a conventional signal readout operation at the time when the quick review display setting is ON.

FIGS. 8A to 8C are illustrative diagrams showing processing to resize image signals according to this embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Hereinafter, a description will be given of an image sensor to be applied to an image capturing apparatus according to the present embodiments, the image sensor being provided with a frame memory and mounted in a digital camera having a quick review display (simple reproduction) function.

Image Sensor Configuration

A description will be given, with reference to FIG. 1, of an outline of a configuration and functions of an image sensor, a signal processor, and a main controller according to the present embodiments.

Figure 1:
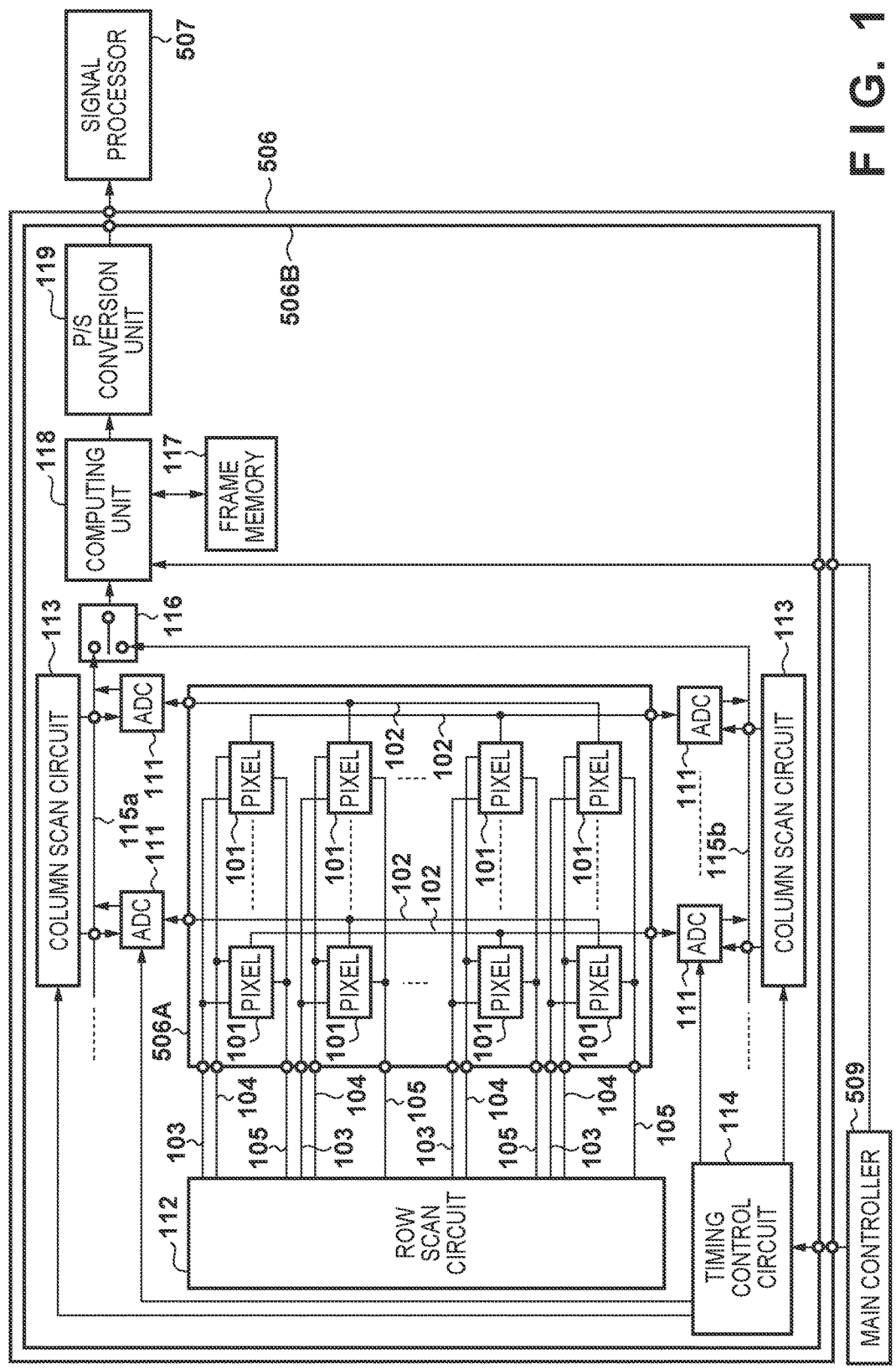
FIG. 1 is a diagram showing a circuitry of an image sensor according to the present embodiments.

In FIG. 1, an image sensor 506 has a first semiconductor substrate (imaging layer) 506A, and a second semiconductor substrate (circuit layer) 506B. A timing control circuit 114 and a computing unit 118 on the second semiconductor substrate 506B are controlled by a main controller 509 such that a pixel signal output from the first semiconductor substrate 506A is processed by the second semiconductor substrate 506B, and is transferred to a signal processor 507, which is provided outside the image sensor 506.

The image sensor 506 has a stacked structure in which the first semiconductor substrate 506A is stacked on the second semiconductor substrate 506B. The first semiconductor substrate 506A includes a pixel region in which a plurality of pixels 101 each having a photoelectric conversion element such as a photodiode are two-dimensionally arranged. The first semiconductor substrate 506A on which the plurality of pixels 101 are arranged is disposed on the light-incident side (i.e. located on the side on which an optical image of an object is received). In the first semiconductor substrate 506A, vertical output lines (column output lines) 102 are connected to the pixels 101 in respective columns in the vertical direction (column direction), and transfer signal lines 103, reset signal lines 104, and row selection signal lines 105 are connected to the pixels in respective rows in the horizontal direction (row direction). Note that the vertical output lines 102 are connected to different pixels in accordance with a readout row unit.

The second semiconductor substrate 506B is provided with a pixel driver that includes AD conversion circuits (hereinafter, column ADCs) 111, a row scan circuit 112, column scan circuits 113, a timing control circuit 114, horizontal signal lines 115a and 115b, and an output switch 116. The second semiconductor substrate 506B is also provided with a frame memory (signal storing unit) 117, a computing unit 118, and a P/S conversion unit 119.

In the pixel driver in the second semiconductor substrate 506B, the column ADCs 111 are connected to the vertical output lines 102, and convert a pixel signal output from each of the plurality of pixels 101 to the corresponding vertical output line 102 into a digital image signal. The row scan circuit 112 is connected to the transfer signal lines 103, the reset signal lines 104, and the row selection signal lines 105. The column scan circuits 113 are connected to the horizontal signal lines 115a and 115b, and outputs a column scan signal to the column ADCs 111. The timing control circuit 114 is connected to the column ADCs 111 and the column scan circuits 113, and outputs a timing signal. The horizontal signal lines 115a and 115b are connected to the output switch 116, and digital image signals are output thereto from the column ADCs 111.

The output switch 116 selectively and sequentially supplies, to the frame memory 117 via the computing unit 118, the digital image signals output from the column ADCs 111 to the horizontal signal line 115a and the horizontal signal line 115b for respective channels. The frame memory 117 temporarily stores digital image signals corresponding to at least one frame that are supplied via the computing unit 118. The computing unit 118 performs resizing processing such as trimming or thinning on digital image signals corresponding to one frame stored in the frame memory 117, thereby generating digital image signals for quick review display. The details of the computing unit 118 will be described later. The computing unit 118 supplies the digital image signals after being subjected to resizing processing to the parallel/serial (P/S) conversion unit 119. The P/S conversion unit 119 performs parallel/serial conversion on the supplied digital image signals, and outputs the resultant image signals to the signal processor 507 (hereinafter also referred to as a digital signal processor), which is provided outside the image sensor 506.

Thus, the pixel region in which the plurality of pixels 101 are arranged is formed on the first semiconductor substrate 506A, and a pixel drive circuit, a memory circuit, a computing circuit, and the like are formed on the second semiconductor substrate 506B. With this configuration, manufacturing processes can be separated between the imaging layer and the circuit layer of the image sensor 506. Accordingly, an increase in the readout speed, a reduction in the size, and an improvement in functionality can be achieved by thinning the wiring (interconnection) in the circuit layer and increasing the density thereof.

Circuitry of Pixel and Column ADC

Figure 2A:
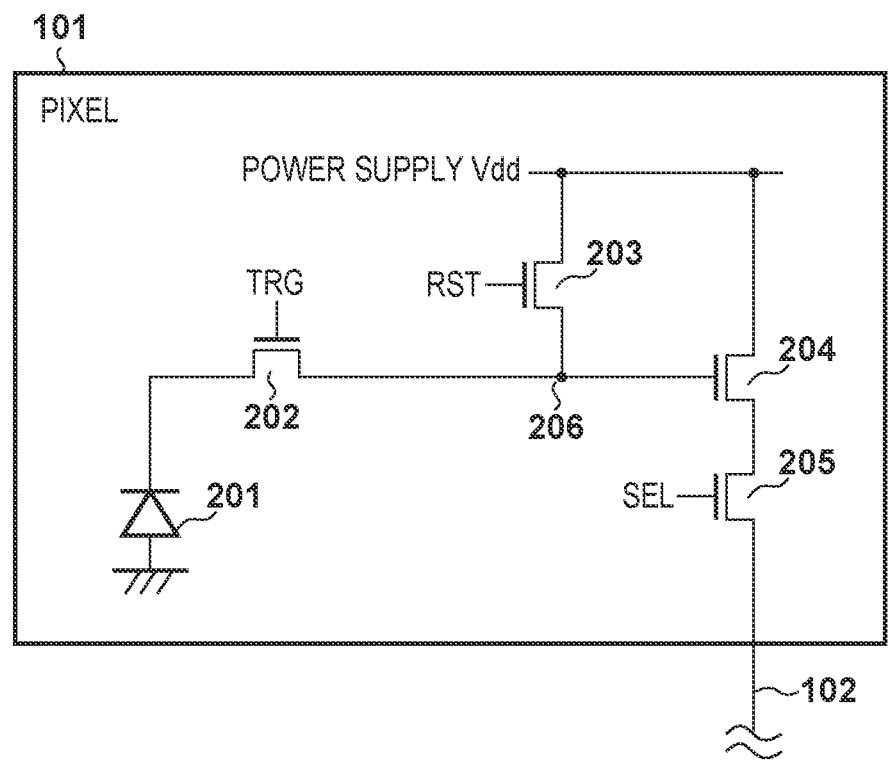
FIGS. 2A and 2B are diagrams showing a configuration of a pixel and a column ADC according to the present embodiments.
Figure 2B:
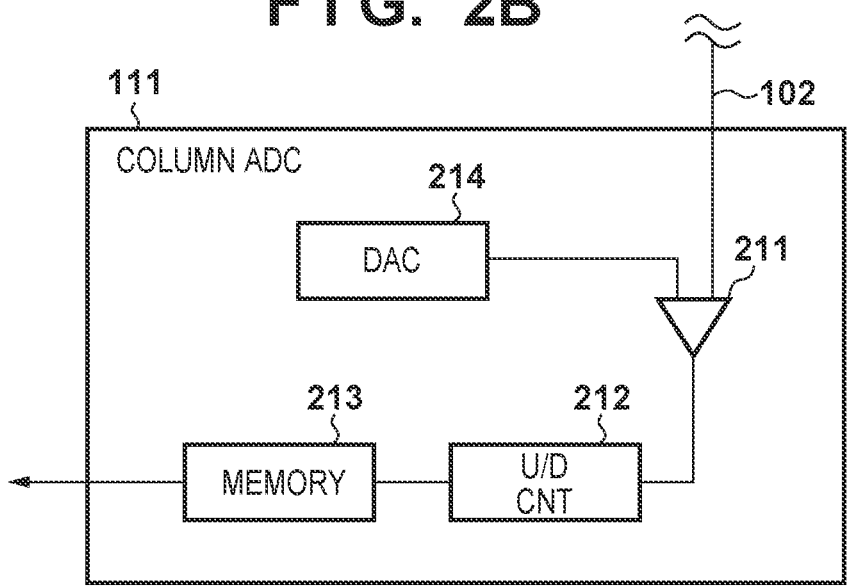

Next, a description will be given, with reference to FIGS. 2A and 2B, of a circuitry of the pixel 101 and the column ADC 111 in the image sensor 506 shown in FIG. 1.

Each pixel 101 has a photodiode 201 and four transistor circuits, which are a transfer transistor 202, a reset transistor 203, an amplifier transistor 204, and a selection transistor 205. These transistors 202 to 205 are N-channel MOS transistors, for example.

The photodiode 201 photoelectrically converts received light into a photocharge (electron) of a charge amount that corresponds to the light amount thereof. The cathode of the photodiode 201 is electrically connected to the gate of the amplifier transistor 204 via the transfer transistor 202. A node 206 that is electrically connected to the gate of the amplifier transistor 204 is called an FD (floating diffusion) portion.

The transfer transistor 202 is connected between the cathode of the photodiode 201 and the FD portion 206. The transfer transistor 202 turns on as a result of a transfer pulse φTRG being applied to the gate thereof via a transfer line (not shown), and transfers the photocharge obtained through photoelectric conversion in the photodiode 201 to the FD portion 206.

The drain and the source of the reset transistor 203 are connected respectively to a pixel power supply Vdd and the FD portion 206. The reset transistor 203 turns on as a result of a reset pulse (pRST being applied to the gate thereof via a reset line (not shown). The reset transistor 203 resets the FD portion 206 by transferring charges in the FD portion 206 to the pixel power supply Vdd, prior to transferring signal charges from the photodiode 201 to the FD portion 206.

The gate and the drain of the amplifier transistor 204 are connected respectively to the FD portion 206 and the pixel power supply Vdd. The amplifier transistor 204 outputs, as a reset level, the potential of the FD portion 206 after being reset by the reset transistor 203, and also outputs, as a signal level, the potential of the FD portion 206 after signal charges have been transferred by the transfer transistor 202.

The drain and the source of the selection transistor 205 are connected respectively to the source of the amplifier transistor 204 and the vertical output line 102, for example. The selection transistor 205 turns on as a result of a selection pulse φSEL being applied to the gate thereof via a selection line (not shown), and sets the photodiode 201 to a selected state to relay a signal output from the amplifier transistor 204 to the vertical output line 102.

Note that a circuitry may also be employed in which the selection transistor 205 is connected between the pixel power supply Vdd and the drain of the amplifier transistor 204. The circuitry is not limited to one in which one pixel 101 is constituted by four transistors as shown in FIGS. 2A and 2B, and one pixel 101 may be constituted by three transistors including a transistor that serves as both the amplifier transistor 204 and the selection transistor 205, for example.

The pixel signal output from a pixel 101 via the vertical output line 102 is transferred to the column ADC 111. The column ADC 111 includes a comparator 211, an up/down counter (U/D CNT) 212, a memory 213, and a DA converter (DAC) 214.

The vertical output line 102 is connected to one of a pair of input terminals of the comparator 211, and the DAC 214 is connected to the other input terminal. The DAC 214 outputs a ramp signal whose level changes in an increasing or decreasing manner as time passes in accordance with a control signal from the timing control circuit 114.

The comparator 211 compares the level of the ramp signal input from the DAC 214 with the level of the pixel signal input from the vertical output line 102. For example, the comparator 211 outputs a high-level comparison signal if the pixel signal level is lower than the ramp signal level, and outputs a low-level comparison signal if the pixel signal level is higher than or equal to the ramp signal level.

The timing control circuit 114 outputs a reference signal to the DAC 214 in accordance with control performed by the main controller 509.

The up/down counter 212 is connected to an output terminal of the comparator 211, and measures the time period taken for the comparison signal to switch from the high level to the low level, for example. Through the counting processing, the output signal of each pixel 101 is converted into a complete digital signal value. Note that the up/down counter 212 measures the time period taken for the comparison signal to switch from the high level to the low level by counting up the pixel signal level from the count value obtained by counting down the reset level.

Note that a configuration may be employed in which an AND circuit is provided between the comparator 211 and the up/down counter 212, a pulse signal is input to this AND circuit, and the up/down counter 212 counts the number of pulse signals.

Thus, as a result of the column ADC 111 calculating a difference between the reset level and the pixel signal level, only pixel signals other than those of the reset level can be extracted.

The memory 213 is connected to the up/down counter 212 and stores the count value for the time period taken for the comparison signal to switch from the high level to the low level, when the up/down counter 212 counts the pixel signals. Note that a configuration may be employed in which the column ADC 111 counts the count value corresponding to the reset level based on a pixel signal at the time when a reset state of the pixel 101 is canceled, also counts the count value based on a pixel signal after a predetermined exposure time, and stores a difference value therebetween in the memory 213.

The count value stored in the memory 213 is transferred, as a digital value corresponding to the pixel signal, to a corresponding one of the horizontal signal line 115a and the horizontal signal line 115b synchronously with a signal from the corresponding column scan circuit 113.

Figure 3A:
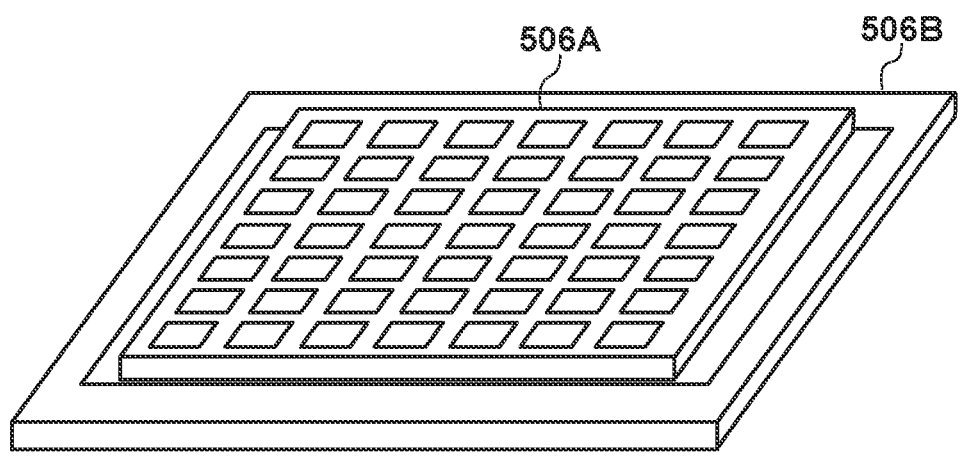
FIGS. 3A and 3B are diagrams showing a stacked structure of the image sensor according to the present embodiments.
Figure 3B:
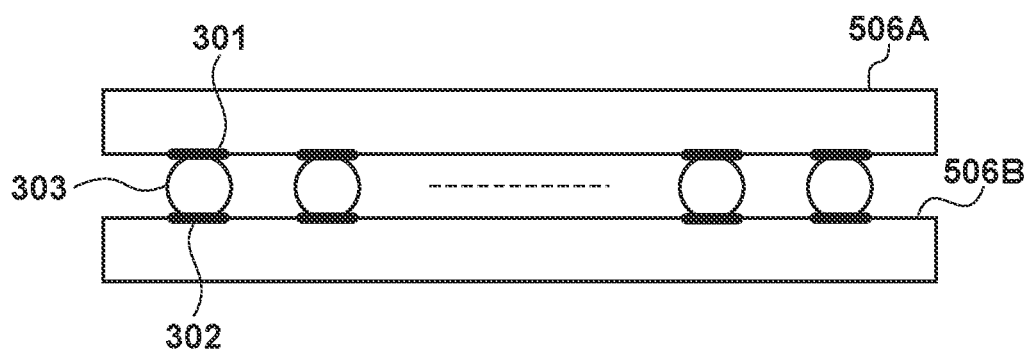

FIGS. 3A and 3B show an exemplary stacked structure of the first semiconductor substrate 506A (imaging layer) and the second semiconductor substrate 506B (circuit layer) in the image sensor 506 according to the present embodiments.

The first semiconductor substrate (imaging layer) 506A and the second semiconductor substrate (circuit layer) 506B are fixed in a state where the first semiconductor substrate 506A is laid over the second semiconductor substrate 506B such that micro pads 301 and 302 of the respective semiconductor substrates are electrically connected to each other via micro bumps 303.

Figure 4:
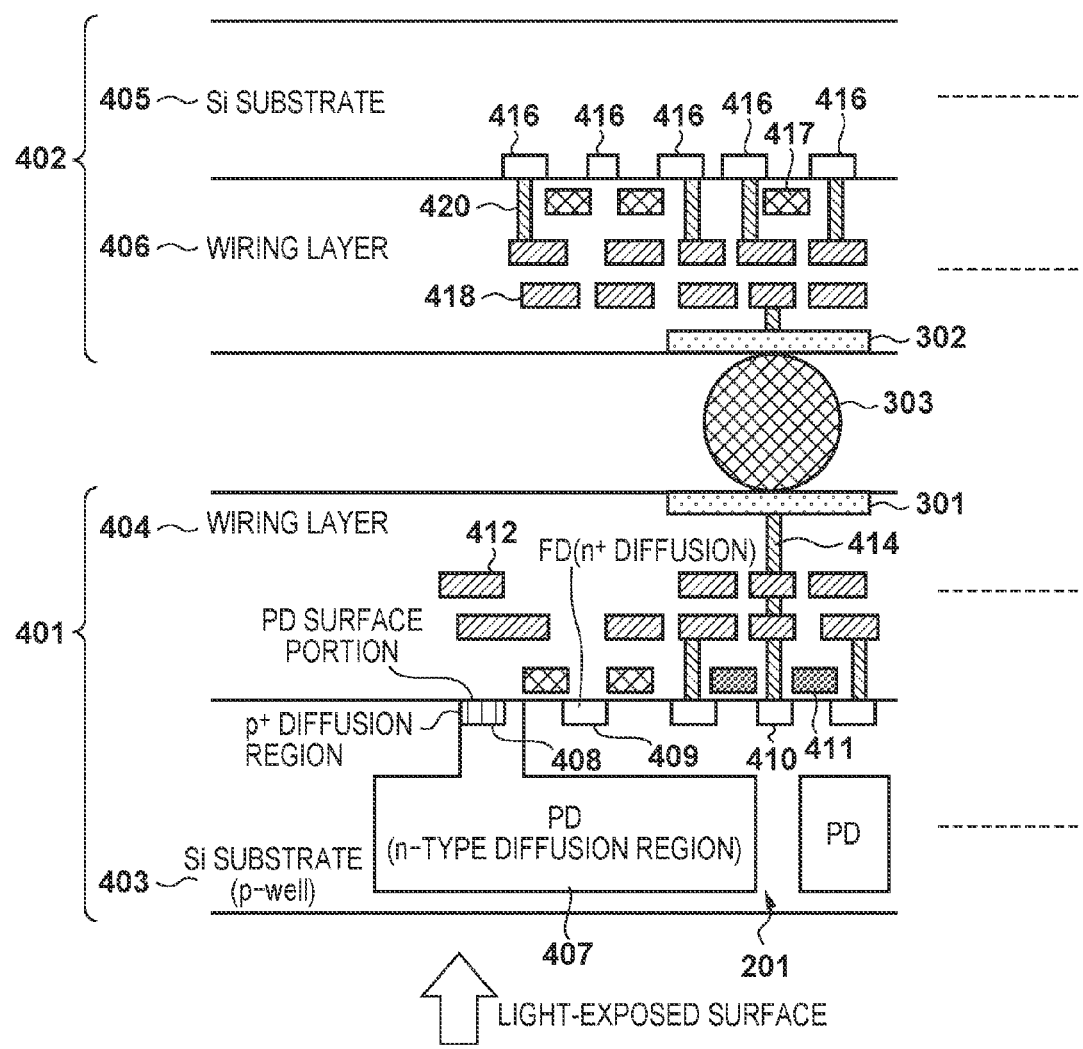
FIG. 4 is a cross-sectional view of the stacked structure of the image sensor according to the present embodiments.

FIG. 4 shows an exemplary detailed cross-sectional structure of the image sensor 506 according to the present embodiments shown in FIGS. 1, 2, 3A, and 3B.

In FIG. 4, an imaging layer 401 and a circuit layer 402 correspond respectively to the first semiconductor substrate 506A and the second semiconductor substrate 506B.

The imaging layer 401 includes an Si substrate 403, a wiring layer 404, n-type diffusion regions 407, 409, and 410, a p+ diffusion region 408, transistor gate wirings 411, a signal propagation wiring 412, a micro pad 301, a VIA 414, and a micro bump 303.

The circuit layer 402 includes an Si substrate 405, a wiring layer 406, transistor gate wirings 417, a signal propagation wiring 418, a micro pad 302, a VIA 420, and transistor diffusion regions 416.

In the above configuration, the micro pad 301 in the imaging layer 401 and the micro pad 302 in the circuit layer 402 are electrically connected to each other via the micro bump 303. In the imaging layer 401, the wiring layer 404 is formed over the Si substrate 403.

The n-type diffusion region 407, which serves as the PD 201, is formed in the Si substrate 403, and the p+ diffusion region 408 is formed in a surface portion (boundary with the wiring layer 404) of the PD 201.

In a surface portion of the Si substrate 403, a plurality of n+ diffusion regions 409 of the FD and a plurality of n+ diffusion regions 410 of the switching transistors are formed.

In the wiring layer 404, the gate wirings 411 of the respective transistors and the signal propagation wiring 412 are formed within an insulating layer, which is made of $SiO_2$ or the like, and the micro pad 301, which is made of Cu or the like, is formed in the surface portion of the wiring layer 404.

The transfer transistor 202, the reset transistor 203, the amplifier transistor 204, and the selection transistor 205 are constituted by the aforementioned n+ diffusion regions 409, n+ diffusion regions 410, and transistor gate wirings 411.

In the wiring layer 404, the VIA 414 for connecting a corresponding n+ diffusion region 410 to the micro pad 301 is formed.

In the circuit layer 402, the wiring layer 406 is formed under the Si substrate 405. A plurality of transistor diffusion regions 416 are formed in a surface portion of the Si substrate 405.

In the wiring layer 406, the gate wirings 417 of the respective transistors and the signal propagation wiring 418 are formed within an insulating layer, which is made of $SiO_2$ or the like, and the micro pad 302, which is made of Cu or the like, is formed in the surface portion of the wiring layer 406.

Various circuits are constituted by the aforementioned transistor diffusion regions 416, transistor gate wirings 417, signal propagation wiring 418, and the like. Note that a detailed description of a cross-sectional structure of the circuit of the image sensor according to the present embodiments will be omitted.

The VIA 420 for connecting a corresponding diffusion region 416 or the like to the micro pad 302 is formed in the wiring layer 406.

Although FIG. 4 shows an exemplary configuration in which the micro pad 301 in the imaging layer 401 and the micro pad 302 in the circuit layer 402 are used as stacking connection terminals and are connected to each other via the micro bump 303, the micro pads 301 and 302 can also be directly connected without being connected via a micro bump.

Apparatus Configuration

An outline of a configuration and functions of the image capturing apparatus according to the present embodiments will be described with reference to FIG. 5.

Figure 5:
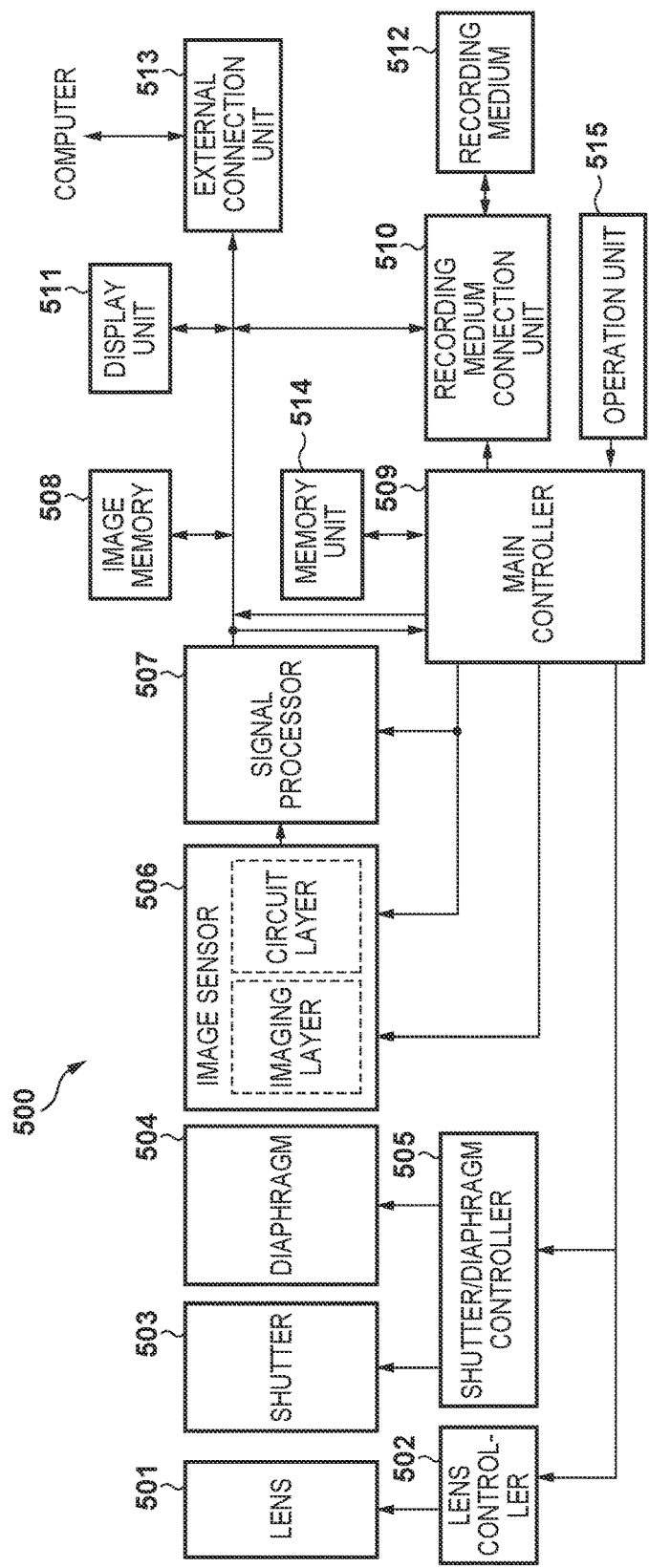
FIG. 5 is a diagram showing a configuration of an image capturing apparatus according to the present embodiments.

In FIG. 5, the image sensor 506 of a stacked type described with reference to FIGS. 1 to 4 is mounted in the image capturing apparatus 500 according to the present embodiments.

A lens 501 includes a focusing lens, a zoom lens, and the like. A lens controller 502 performs control for driving the lens 501 based on a control signal given by the main controller 509.

A shutter 503 is a mechanical shutter that is mechanically driven in order to adjust the time period for exposing an imaging surface (light-exposed surface) of the image sensor 506 to object image light. A diaphragm 504 is for adjusting the light amount of an object image formed on the imaging surface of the image sensor 506, and includes aperture blades that can be mechanically driven to change the aperture diameter. A shutter/diaphragm controller 505 performs control for driving the shutter 503 and the diaphragm 504 based on a control signal given by the main controller 509.

The light amount of an object image that is incident through the lens unit 501 is adjusted to an appropriate light amount by the diaphragm 504, and is formed on an imaging surface of the image sensor 506. The object image formed on the imaging surface of the image sensor 506 is subjected to photoelectric conversion by the PD 201 in each pixel 101, as well as gain adjustment, converted into digital image signals from analog image signals, taken in as R, Gr, Gb, and B digital signals, and is sent to the digital signal processor 507.

The digital signal processor 507 performs, on the digital image signals output from the image sensor 506, low pass filter processing and shading processing to reduce noise, image processing such as white balance (WB) processing, development processing such as color conversion processing and gamma correction processing, and compression processing in accordance with a predetermined format, and generates image data. The digital signal processor 507 also has a function of receiving the digital image signals obtained as a result of parallel/serial conversion performed by the P/S conversion unit 119 in the image sensor 506 and storing the received digital image signals in an image memory 508, and a function of writing image data in the image memory 508 and/or a recording medium 512 and reading out image data stored in the image memory 508 and/or the recording medium 512. The signal processor 507 also has a function of detecting photometry data, such as an in-focus state and exposure, from the digital image signals output from the image sensor 506. The image memory 508 temporarily stores the image data output from the digital signal processor 507.

The main controller 509 includes a CPU, a main memory (RAM), an input/output circuit, a timer circuit, and the like, and controls operations of the overall apparatus as a result of the CPU loading a program stored in the memory unit 514 into a work area of the RAM and executing this program. The main controller 509 generates a timing signal for driving the image sensor 506, and outputs this timing signal to the image sensor 506 and the signal processor 507.

A recording medium connection unit 510 is an interface for reading and writing data from/to the recording medium 512.

A display unit 511 is a liquid-crystal display (LCD) or an organic EL display, for example, displays an image, performs display to assist in operation, displays the camera status, and also displays a shooting screen and a distance-measuring area during shooting.

Image data (still image and video) output from the digital signal processor 507 is recorded in the recording medium 512. The recording medium 512 may be a memory card, a hard disk drive, or the like that is attached to the image capturing apparatus 500, or may be a flash memory or a hard disk drive contained in the image capturing apparatus 500. Note that the memory unit 514 and the recording medium 512 may be the same component.

An external connection unit 513 is an interface for communicating with an external device such as a personal computer (PC) to exchange data.

Constants for operations of the CPU in the main controller 509, a program, setting information, and the like are recorded in the memory unit 514. The aforementioned program refers to a program for executing quick review display processing, which will be described later in the present embodiments.

An operation unit 515 is an operation device for accepting a user operation to input various instructions for the image capturing apparatus 500, and may be in various forms such as physical operation members, namely buttons, switches, or the like, and input unit that employs a touch panel. The operation unit 515 includes, for example, a menu switch for configuring various settings at the time of shooting or reproducing an image, a zoom lever for making a zoom operation instruction to the lens, a switch for switching between operation modes such as a shooting mode and a reproduction mode, a shutter switch, a power switch, and the like. The main controller 509 controls the image capturing apparatus 500 based on an instruction or settings input via the operation unit 515 by a user, and causes the display unit 511 to display setting information, the operation status, an image, or the like.

Still Image Shooting Processing

Next, a description will be given, with reference to FIG. 6, of still image shooting processing performed by the image capturing apparatus according to the first embodiment.

Figure 6:
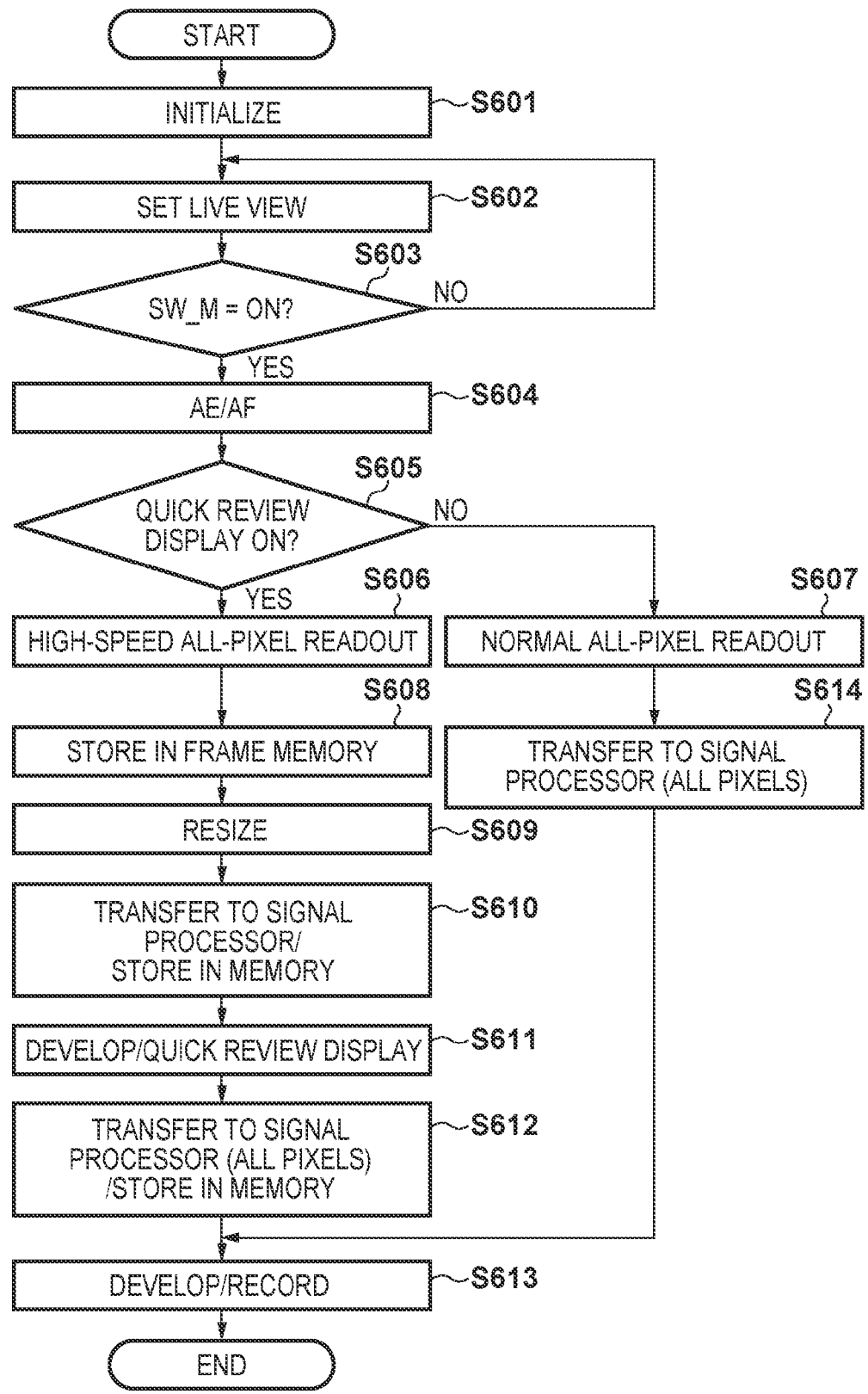
FIG. 6 is a flowchart of still image shooting processing according to a first embodiment.

Note that the processing shown in FIG. 6 starts when the operation mode of the image capturing apparatus 500 is set to a still image shooting mode. Note that the CPU in the main controller 509 realizes the processing in FIG. 6 by loading a program read out from the memory unit 514 into a main memory and executing this program. The same applies to later-described processing shown in FIG. 10.

In step S601, the main controller 509 initializes various parameters based on the settings input from the operation unit 515 by the user. The initialized parameters are recorded in the memory unit 514.

The main controller 509 records, in the memory unit 514, "2 seconds", "4 seconds", or "no display" as information regarding a quick review display time after shooting. Note that the quick review display time can be switched by a user operation made via the operation unit 515.

In step S602, the main controller 509 sets a live view mode in which the display unit 511 continuously displays captured images in real time. In the live view mode, the image sensor 506 is driven in a mixing/thinning mode for reading out pixel signals therefrom while mixing or thinning out some of the pixel signals, then digital image signals are read out from the image sensor 506, various kinds of signal processing is performed on the read digital image signals by the signal processor 507, and these image signals are displayed on the display unit 511. During the live view mode, a photometry operation (AE operation) and a distance measurement operation (AF operation) are performed as appropriate. That is to say, the signal processor 507 measures the brightness of the object and the focal length based on the digital image signals read out from the image sensor 506, and calculates the f-number Av, the shutter speed Tv, and the lens position L with which an appropriate brightness and focal length are achieved. The main controller 509 then outputs a control signal to the lens controller 502 and the shutter/diaphragm controller 505 so as to achieve the calculated f-number Av, shutter speed Tv, and lens position L, and drives the lens 501, the shutter 503, and the diaphragm 504. The above-calculated f-number Av, shutter speed Tv, and lens position L are recorded in the memory unit 514.

In step S603, the main controller 509 determines whether a video recording start switch SW_M, which is included in the operation unit 515, is ON or OFF, and advances the processing to step S604 if SW_M is ON, or returns the processing to step S602 if SW_M is OFF.

In step S604, the main controller 509 reads out the f-number Av, the shutter speed Tv, and the lens position L from the memory unit 514. The main controller 509 recalculates the f-number Av and the shutter speed Tv based on the read f-number Av and the shutter speed Tv. Regarding the lens position L, the value thereof read out from the memory unit 514 is used. The main controller 509 controls the lens controller 502 and the shutter/diaphragm controller 505 so as to achieve the aforementioned f-number Av, shutter speed Tv, and lens position L, and drives the lens 501, the shutter 503, and the diaphragm 504.

In step S605, the main controller 509 determines whether or not the quick review display setting recorded in the memory unit 514 is ON or OFF. If the quick review display setting is ON (simple reproduction mode), the main controller 509 selects a high-speed all-pixel readout operation using the frame memory 117 (S606). If the quick review display setting is OFF, the main controller 509 selects a normal all-pixel readout operation (S607). In the high-speed all-pixel readout operation, digital image signals from all pixels are temporarily stored in the frame memory 117, and therefore, the digital image signals can be read out at high speed without being affected by the processing capability of the P/S conversion unit 119 and the digital signal processor 507. In this embodiment, the highest speed of writing to the frame memory 117 is 120 fps.

On the other hand, the normal all-pixel readout operation does not use the frame memory 117, and the readout speed is determined depending on the processing capabilities of the P/S conversion unit 119 and the digital signal processor 507. In this embodiment, the processing capability of the P/S conversion unit 119 is 50 fps, which is the highest speed at which digital image signals are read out from the image sensor 506. The readout speed can also be reduced in accordance with the processing capability of the signal processor 507, and the readout speed in this embodiment is set to 20 fps.

In step S606, the main controller 509 performs the high-speed all-pixel readout operation, and in step S608, the main controller 509 temporarily stores the image signals from all pixels in the frame memory 117.

In step S609, the main controller 509 causes the computing unit 118 to trim an image for quick review display (for simple reproduction) and to perform resizing processing such as thinning on the digital image signals stored in the frame memory 117. The details thereof will be described later with reference to FIGS. 8A to 8C.

In step S610, the main controller 509 causes the P/S conversion unit 119 to perform parallel/serial conversion on the digital image signals of a size for quick review display that have been resized in step S609, transfers those image signals to the digital signal processor 507, and stores the image signals in the image memory 508.

In step S611, the main controller 509 causes the signal processor 507 to perform development processing on the digital image signals stored in the image memory 508, and performs quick review display.

In step S612, during quick review display in step S611, the main controller 509 causes the P/S conversion unit 119 to perform parallel/serial conversion on the digital image signals from all pixels stored in the frame memory 117 in step S608, transfers those image signals to the digital signal processor 507, and stores the image signals in the image memory 508.

In step S613, the main controller 509 causes the digital signal processor 507 to perform development processing, compression processing, and the like on the digital image signals from all pixels that have been read out and stored in the image memory 508 in step S612, and records the generated image data in the recording medium 512.

On the other hand, if, in step S605, the quick review display setting is OFF, the main controller 509 performs a normal all-pixel readout operation in step S607, supplies, in step S614, the digital image signals from all pixels to the P/S conversion unit 119 to perform parallel/serial conversion thereon without storing the digital image signals in the frame memory 117, transfers those image signals to the digital signal processor 507, and stores the image signals in the image memory 508. Thereafter, the same processing as that in step S613 is performed.

Next, a description will be given, with reference to FIGS. 7A to 7C, of the signal readout operation corresponding to the quick review display setting according to this embodiment with comparison with a conventional signal readout operation.

Figure 7A:
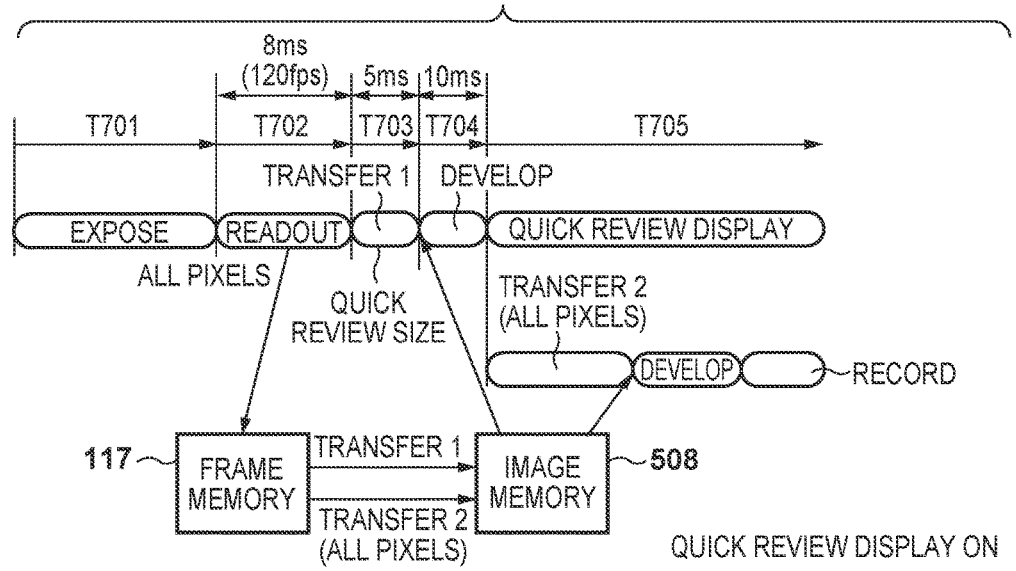

FIG. 7A shows a signal readout operation at the time when the quick review display setting is ON in the processing in FIG. 6. Upon the exposure time (T701) having elapsed in the image sensor 506, the high-speed all-pixel readout operation is performed, and the digital image signals from all pixels are stored in the frame memory 117 (T702). Thereafter, the digital image signals that have been resized by the computing unit 118 are transferred to the signal processor 507 (T703), and are stored in the image memory 508. The digital image signals transferred to the signal processor 507 are subjected to development processing (T704) to perform quick review display (T705). The digital image signals from all pixels stored in the frame memory 117 are transferred to the signal processor 507 and stored in the image memory 508 during quick review display (T705), and development processing and recording processing are performed thereon.

Figure 7B:
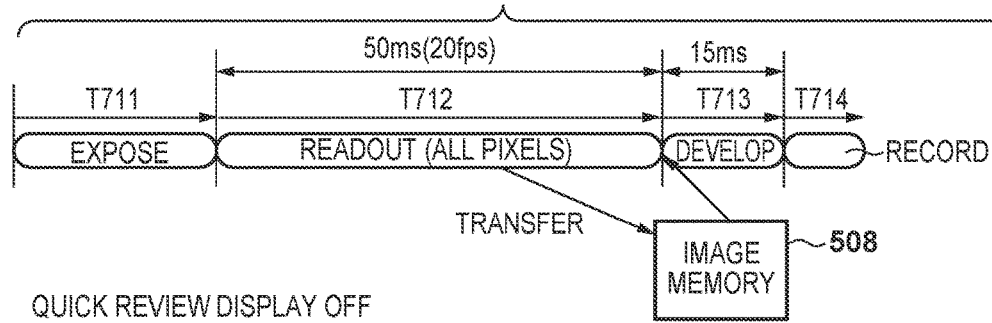

FIG. 7B shows a signal readout operation at the time when the quick review display setting is OFF during the processing in FIG. 6. Upon the exposure time (T711) having elapsed in the image sensor 506, the normal all-pixel readout operation is performed, and the digital image signals from all pixels are transferred to the signal processor 507 without being transferred via the frame memory 117 and are stored in the image memory 508 (T712). The signal processor 507 performs development processing (T713) and recording processing (T714) on the digital image signals stored in the image memory 508. Note that the fastest readout speed in the normal all-pixel readout mode is indicated in FIG. 7B, and more time may be required depending on the processing capability of the signal processor 507. The readout speed in this embodiment is 20 fps.

Figure 7C:
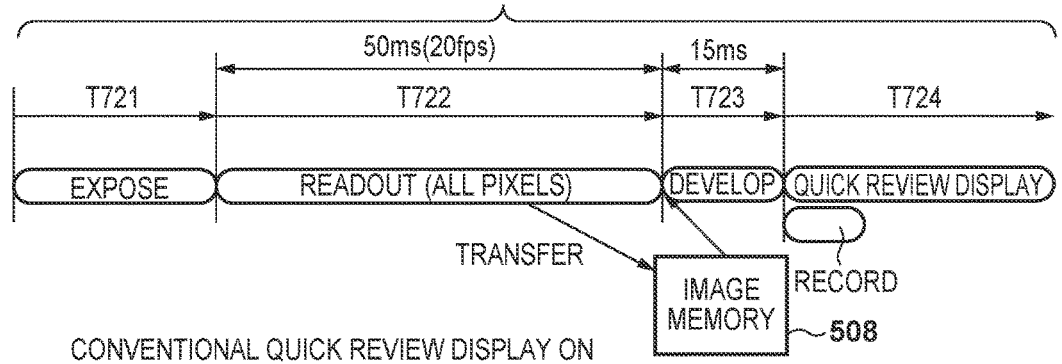
Figure 9:
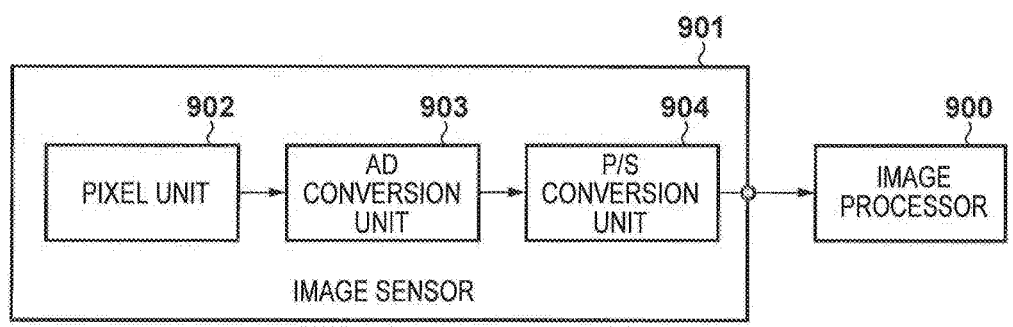
FIG. 9 is a diagram showing a schematic configuration of a conventional image capturing apparatus.

FIG. 7C shows a signal readout operation at the time when a conventional quick review display setting is ON. Upon the exposure time (T721) having elapsed in the image sensor 506, the normal all-pixel readout operation is performed, while the digital image signals from all pixels are simultaneously transferred to the signal processor 507 and are stored in the image memory 508 (T722). The image signals transferred to the signal processor 507 are subjected to development processing (T723) to perform quick review display (T724), and recording processing (T724) is simultaneously performed.

Next, the resizing processing performed by the computing unit 118 will be described with reference to FIGS. 8A to 8C.

In the resizing processing according to this embodiment, processing to add or thin out image signals stored in the frame memory 117 every several rows or columns in the vertical direction or the horizontal direction, processing to reduce the image size through trimming to use only a partial area of the image signals, processing to change the data volume of each pixel to fewer bits (e.g. change the data volume from 16 bits to 10 bits), or the like.

Figures 8A, 8B, 8C:
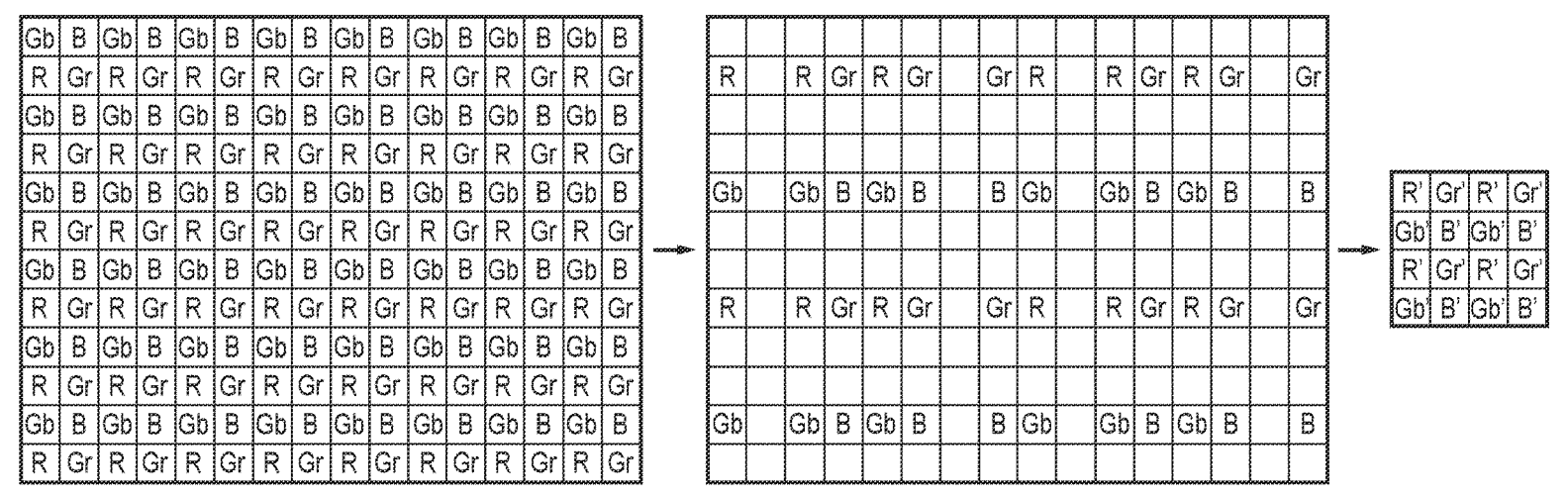

FIGS. 8A to 8C show an example of mixing/thinning processing to mix three pixels in the horizontal direction and thin out the pixels to one-third in the vertical direction.

In the mixing/thinning processing, only signals of the pixels shown in FIG. 8B are used from among the image signals from all pixels in FIG. 8A, and post-mixing/thinning signals R', Gr', Gb', and B' are calculated using the following equations. Thus, the image signals shown in FIG. 8C are generated as an image for quick review display.

$$R'=(R+R+R)/3$$

$$Gr'=(Gr+Gr+Gr)/3$$

$$Gb'=(Gb+Gb+Gb)/3$$

$$B'=(B+B+B)/3$$

As described above, according to this embodiment, the operation to read out signals from the image sensor is switched between the high-speed all-pixel readout operation using the frame memory 117 in the image sensor 506 and the normal all-pixel readout operation without using the frame memory 117 in accordance with the quick review display setting. Specifically, the image signals from all pixels are temporarily stored in the frame memory 117 when the quick review display setting is ON, and the image signals that have been resized for quick review display are first transferred to the signal processor 507. The image signals from all pixels stored in the frame memory 117 are transferred to the signal processor 507 during quick review (during simple reproduction), and are subjected to development processing and recording processing. As a result, the time taken for quick review display to be performed after shooting can be shortened, and system performance can be improved.

Second Embodiment

Next, the second embodiment will be described with reference to FIGS. 10 and 11.

The first embodiment has described the method in which the digital image signals that have been resized for quick review display during the processing in FIG. 6 are first transferred, and the digital image signals from all pixels are transferred and recorded during quick review display. In contrast, the second embodiment will describe a method in which the digital image signals from all pixels stored in the frame memory 117 are transferred simultaneously with transfer of the digital image signals resized for quick review display.

Note that the configuration of the image sensor 506 and the image capturing apparatus 500 according to this embodiment is the same as that shown in FIGS. 1 to 5 and described in the first embodiment, and a description thereof will be omitted accordingly. The resizing processing is also the same as that depicted in FIGS. 8A to 8C, and a description thereof will be omitted accordingly.

Figure 10:
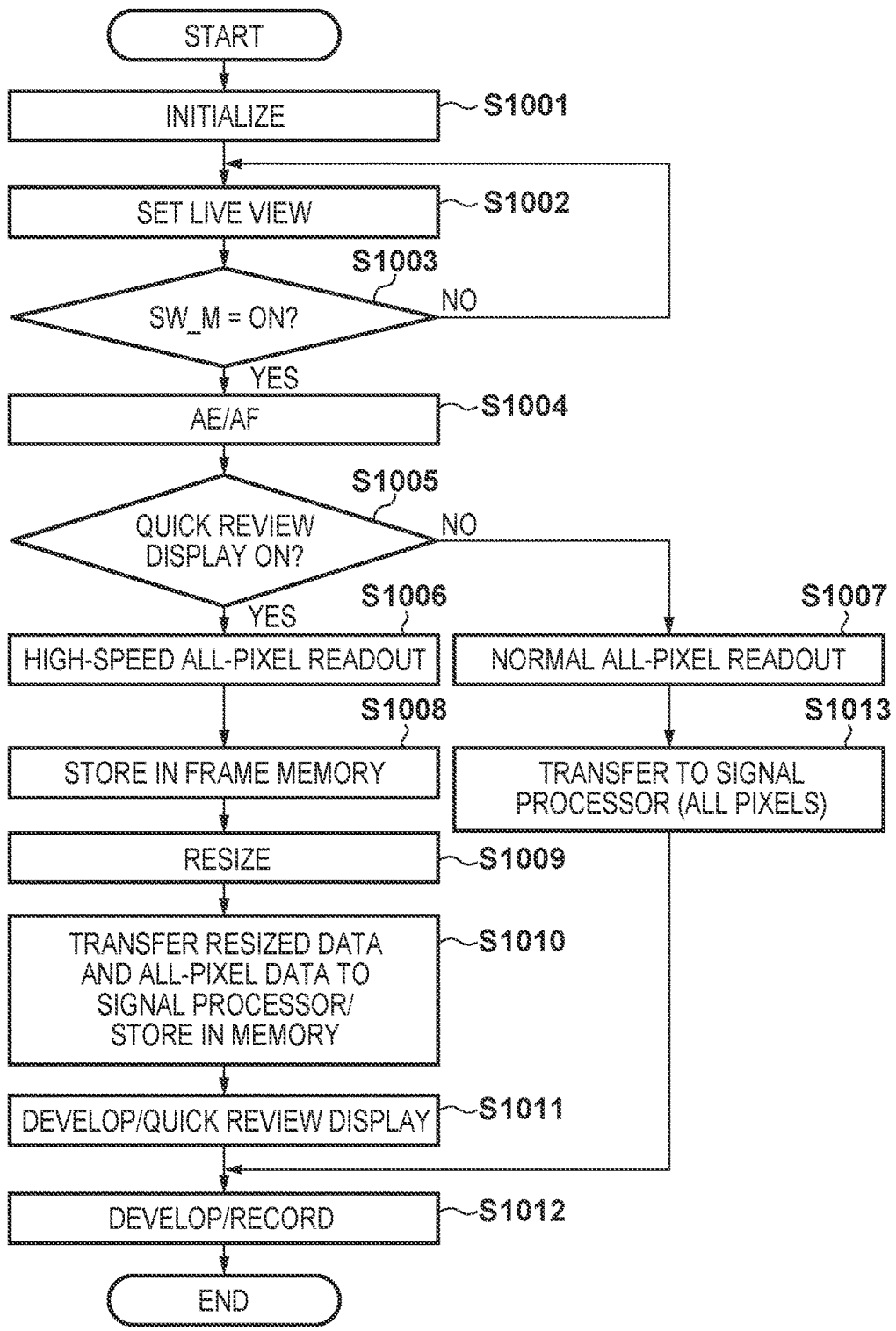
FIG. 10 is a flowchart of still image shooting processing according to a second embodiment.

FIG. 10 shows still image shooting processing according to the second embodiment. The following description will focus on differences from the first embodiment. Processing in steps S1001 to S1009 and S1013 is the same as the processing in steps S601 to S609 and S614 in FIG. 6.

In step S1010, similar to S610, the main controller 509 causes the P/S conversion unit 119 to perform parallel/serial conversion on the digital image signals of a size for quick review display that have been resized in step S1009, transfers those digital image signals to the signal processor 507, and stores the image signals in the image memory 508. Simultaneously, similar to step S612, the main controller 509 causes the P/S conversion unit 119 to perform parallel/serial conversion on the digital image signals from all pixels stored in the frame memory 117 in step S1008, transfers those digital image signals to the signal processor 507, and stores the image signals in the image memory 508. In the parallel/serial conversion performed by the P/S conversion unit 119, two conversion units are prepared respectively for the digital image signals for quick review display and the digital image signals from all pixels, thereby enabling the digital image signals for quick review display and the digital image signals from all pixels to be output simultaneously.

Processing in steps S1011 to S1012 is the same as the processing in steps S612 and S613 in FIG. 6.

Figure 11:
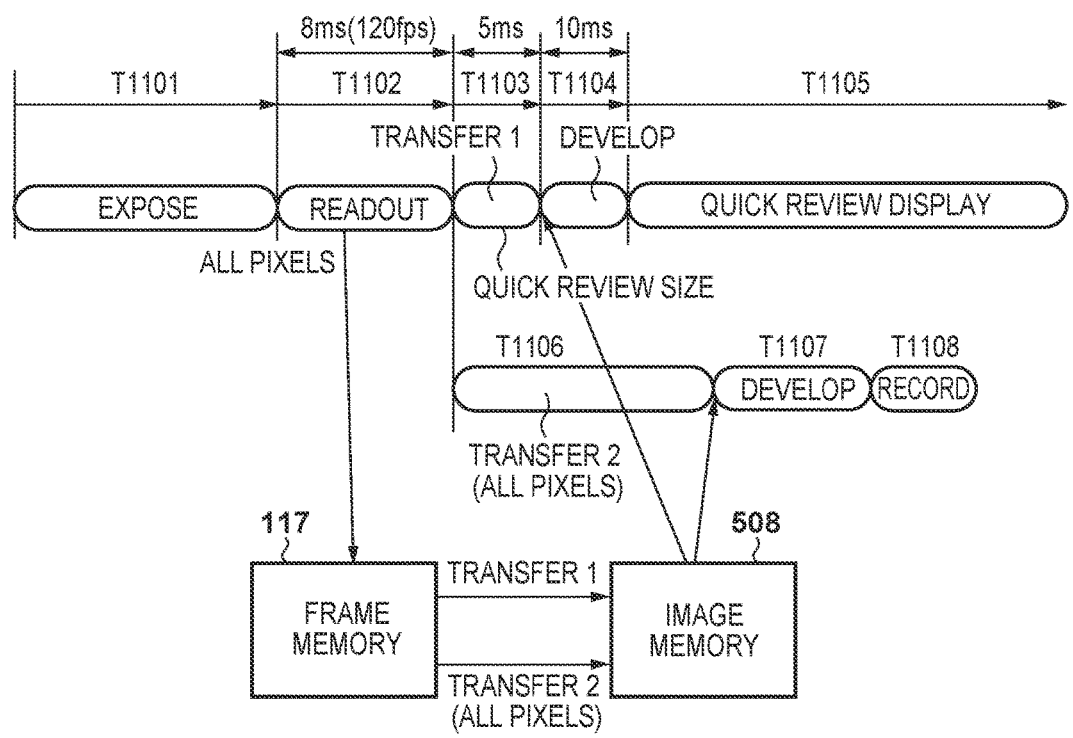
FIG. 11 is a timing chart illustrating a signal readout operation at the time when the quick review display setting is ON according to the second embodiment.

FIG. 11 is a timing chart illustrating a signal readout operation at the time when the quick review display setting is ON during the processing in FIG. 10. Upon the exposure time (T1101) having elapsed in the image sensor 506, the high-speed all-pixel readout operation is performed, and the digital image signals from all pixels are stored the frame memory 117 (T1102). Thereafter, the digital image signals resized by the computing unit 118 are transferred to the signal processor 507 (T1103), and simultaneously, the digital image signals from all pixels stored in the frame memory 117 are transferred to the signal processor 507 (T1106) and stored in the image memory 508. The signal processor 507 performs development processing (T1104) on the digital image signals of a size for quick review display stored in the image memory 508, and thereafter performs quick review display (T1105). The signal processor 507 also performs development processing (T1107) and recording processing (T1108) on the digital image signals from all pixels stored in the image memory 508.

As described above, according to this embodiment, the operation to read out signals from the image sensor is switched between the high-speed all-pixel readout operation using the frame memory 117 in the image sensor 506 and the normal all-pixel readout operation without using the frame memory 117 in accordance with the quick review display setting. Specifically, the image signals from all pixels are temporarily stored in the frame memory 117 when the quick review display setting is ON, and are transferred to the signal processor 507 simultaneously with the image signals resized for quick review display. As a result, the time taken for quick review display to be performed after shooting can be shortened, and system performance can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-096363, filed May 12, 2016 which is hereby incorporated by reference herein in its entirety.

What is claimed is:

1. An image capturing apparatus comprising:
an image sensor including two-dimensionally arranged pixels each having a photoelectric conversion element, a signal storing unit in which image signals that are output from the pixels are stored, and a resizing unit which resizes the image signals;
a controller which controls an operation to read out the image signals from the image sensor;
a signal processor which performs signal processing on the image signals and output the image signals to a display unit; and
a setting unit which sets a simple reproduction mode in which the image signals are resized by the resizing unit and a simple reproduction on the display unit is performed,
wherein, in a case where the simple reproduction mode is set by the setting unit, the controller controls such that the image signals that are output from the pixels are stored in the signal storing unit, the image signals stored in the signal storing unit are resized by the resizing unit, the image signals that are resized by the resizing unit are transferred to the signal processor, and the image signals that are not resized by the resizing unit are transferred from the signal storing unit to the signal processor after the simple reproduction is started, and in a case where the simple reproduction mode is not set by the setting unit, the controller controls such that the image signal that are output from the pixels are transferred to the signal processor without storing the image signals in the signal storing unit.

2. The apparatus according to claim 1, further comprising a storing unit in which the image signals read out from the image sensor are stored, wherein the signal processor performs signal processing on the image signals stored in the storing unit, and outputs the image signals to the display unit.

3. The apparatus according to claim 1, wherein the resizing unit reduces a size of the image signals.

4. The apparatus according to claim 1, wherein the image sensor is configured by stacking a first semiconductor substrate on which the pixels are provided, on a second semiconductor substrate on which the signal storing unit and the resizing unit are provided.

5. The apparatus according to claim 4, wherein the second semiconductor substrate also provided with a pixel driver which drives the pixels, and an AD conversion circuit which converts the image signals output from the pixels into digital signals.

6. An image capturing apparatus comprising:

an image sensor including two-dimensionally arranged pixels each having a photoelectric conversion element, and a signal storing unit in which image signals that are output from the pixels are stored;

a controller which controls an operation to read out the image signals from the image sensor; and a signal processor which performs signal processing on the image signals and output the image signals to a display unit, wherein, in a simple reproduction mode in which the image signals are resized and a simple reproduction on the display unit is performed, the controller controls such that the image signals that are output from the pixels are stored in the signal storing unit, the image signals stored in the signal storing unit are resized, the image signals that are resized are transferred to the signal processor, and the image signals that are not resized are simultaneously transferred from the signal storing unit to the signal processor.

7. A control method of an image capturing apparatus which has: an image sensor including two-dimensionally arranged pixels each having a photoelectric conversion element, a signal storing unit in which image signals that are output from the pixels are stored, and a resizing unit which resizes the image signals; a controller which controls an operation to read out the image signals from the image sensor; a signal processor which performs signal processing on the image signals and output the image signals to a display units; and a setting unit which sets a simple reproduction mode in which the image signals are resized by the resizing unit and a simple reproduction on the display unit performed, the method comprising:

storing, in the signal storing unit, the image signals that are output from the pixels in a case where simple reproduction mode is set by the setting unit;

resizing, by the resizing unit, the image signals stored in the signal storing unit, transferring the image signal that are resized by the resizing unit to the signal processor; and transferring the image signals that are not resized, by the resizing unit from the signal storing unit to the signal processor after the simple reproduction is started, and transferring the image signal that are output from the pixels to the signal processor without storing the image signals in the signal storing unit, in a case where the simple reproduction mode is not set by the setting unit.

8. A control method of an image capturing apparatus which has: an image sensor including two-dimensionally arranged pixels each having a photoelectric conversion element, and a signal storing unit in which image signals that are output from the pixels are stored; a controller which controls an operation to read out the image signals from the image sensor; and a signal processor which performs signal processing on the image signals and output the image signals to a display unit, the method comprising:

storing, in the signal storing unit, the image signals that are output from the pixels in a simple reproduction mode in which the image signals are resized and a simple reproduction on the display unit is performed; and resizing the image signals stored in the signal storing unit, transferring the image signals that are resized to the signal processor, and simultaneously transferring the image signals that are not resized from the signal storing unit to the signal processor.

* * * * *